(12) United States Patent
Matsumoto et al.

(10) Patent No.: US 7,659,682 B2
(45) Date of Patent: Feb. 9, 2010

(54) SERVO MOTOR CONTROLLING METHOD

(75) Inventors: Ichiro Matsumoto, Numazu (JP); Jun Fujita, Mishima (JP); Minoru Hamamura, Shizuoka-Ken (JP)

(73) Assignee: Toshiba Kikai Kabushiki Kaisha, Tokyo-To (JP)

( * ) Notice: Subject to any disclaimer, the term of this patent is extended or adjusted under 35 U.S.C. 154(b) by 178 days.

(21) Appl. No.: 11/690,189

(22) Filed: Mar. 23, 2007

(65) Prior Publication Data

US 2008/0012520 A1 Jan. 17, 2008

(30) Foreign Application Priority Data

Mar. 24, 2006 (JP) ............... 2006-083696

(51) Int. Cl.
G05B 11/32 (2006.01)
(52) U.S. Cl. ..................... 318/625; 318/432
(58) Field of Classification Search ........... 318/625, 318/432, 632, 799, 823
See application file for complete search history.

(56) References Cited

U.S. PATENT DOCUMENTS

| 6,310,457 | B1 * | 10/2001 | Iwashita et al. | 318/570 |
| 6,515,442 | B1 * | 2/2003 | Okubo et al. | 318/560 |
| 6,861,816 | B2 * | 3/2005 | Eguchi | 318/632 |
| 2005/0137739 | A1 * | 6/2005 | Yoshida et al. | 700/170 |
| 2006/0012326 | A1 * | 1/2006 | Iwashita et al. | 318/645 |

FOREIGN PATENT DOCUMENTS

| JP | 07-13631 | 1/1995 |
| JP | 7-13631 | 1/1995 |
| JP | 10-063325 | 3/1998 |
| JP | 10-63325 | 3/1998 |
| JP | 2001-350523 | 12/2001 |

OTHER PUBLICATIONS

Machine English translation of JP 10-63325 published on Mar. 6, 1998.
English abstract of JP 10-63325 published on Mar. 6, 1998.
Machine English translation of JP 07-13631 published on Jan. 17, 1995.

(Continued)

Primary Examiner—Rina I Duda
(74) Attorney, Agent, or Firm—DLA Piper LLP US

(57) ABSTRACT

A servo motor controlling method includes: directly or indirectly detecting a position of a moving body which performs a circular-arc interpolation feeding motion by a servo motor; performing a feedback control for enabling the position of the moving body to comply with a position command; and at a quadrant changing time when a moving direction of the moving body is changed, performing torque correction on a torque command value according to a distance from a position where the moving direction is changed. By this method, a quadrant protrusion and a torque change with respect to a friction caused from a free zone at a time of reversion of a ball screw can be appropriately corrected. Especially, by performing a first torque correction for a static friction at the position where the moving direction is changed, and by performing a second torque correction for a moving friction after movement by the distance corresponding to the free zone, more appropriate correction can be obtained.

5 Claims, 9 Drawing Sheets

OTHER PUBLICATIONS

English abstract of JP 07-13631 published on Jan. 17, 1995.
Machine English translation of JP 2001-350523 published on Dec. 21, 2001.
English abstract of JP 2001-350523 published on Dec. 21, 2001.
Korean Office Action issued on Aug. 22, 2008 in counterpart Korean Application No. 10-2007-0026112.
English translation of the Korean Office Action issued on Aug. 22, 2008 in counterpart Korean Application No. 10-2007-0026112.

* cited by examiner

TORQUE COMMAND WAVEFORM

DBB MEASUREMENT RESULT

CORRECTED TORQUE WAVEFORM

TORQUE WAVEFORM

GRADUALLY-DECREASING TYPE CORRECTION TORQUE

CORRECTION TORQUE IN CASE OF NO FREE ZONE

SERVO MOTOR CONTROLLING METHOD

CROSS REFERENCE TO RELATED APPLICATION

This application is based upon and claims the benefit of priority from the prior Japanese Patent Application No. 2006-83696, filed on Mar. 24, 2006, the entire contents of which are incorporated herein by reference.

BACKGROUND OF THE INVENTION

1. Field of the Invention

The present invention relates to a servo motor controlling method and, more particularly, to a servo motor controlling method or driving a feeding shaft of a machine tool or an arm of an industrial robot.

2. Related Art

In order to improve a movement accuracy of a numerical control (NC) machine tool or an industrial robot, an accuracy of shape of each component needs to be improved, and assembling of mechanisms and adjusting of a control system need to be accurately performed so as to optimally control operations.

For example in a general servo motor control system for a servo motor in a machine tool which performs two-axis arc interpolation feeding movement, a position loop for allowing a deviation between an NC position command and a feedback signal output, from a position detector disposed a servo motor or a moving body such as a table saddle driven by the servo motor to be zero is provided, and a velocity loop for a velocity feedback signal obtained by differentiating a position feedback signal is provided to use an output of a velocity loop gain as a torque control value.

However, in such a servo motor control system, wherein a rotating direction of the servo motor is reversed, the moving direction of the moving body cannot be directly reversed. This is caused from a lost motion or friction in a feed driving mechanism. When such a circular-arc cutting is performed, a quadrant of a circular arc is changed, and an actual moving path deviates out from a commanded path, so that a bulge of path may occur. The phenomenon is referred to as a stick motion or a quadrant protrusion and becomes one of factors of deterioration in accuracy of contour machining which is one of important operations of the machine tool.

The phenomenon is regarded to cause temporary stoppage of a feeding shaft. More specifically, when the moving direction is reversed, a torque command corresponding to a frictional torque needed to be reversed. However, in a guide, a ball bearing, a ball screw or the like, a three-point contact becomes a two-point contact when the moving direction of the servo motor is reversed. Therefore, a delay occurs in the velocity loop, so that the feeding shaft may be temporarily stopped.

In order to correct the error, techniques for correction of torque at the time of reversion are disclosed. Particularly, Japanese Patent Application Laid-Open Publication (JP-A) No. 10-63325 (Patent document) previously filed by the applicant of the present invention describes that the torque is assisted only at the time of moving direction reversion.

In addition to the phenomenon, recent researches show that a friction after reversion is changed in a free zone, that is, a low-friction region of a ball screw (referred to as a ball contact number changing region). If the changing friction is not corrected, the protrusion-shaped machining error remains, or a depressed portion may occur.

For example, since the technique disclosed in JP-A-10-63325 cannot cope with the change in friction caused from the aforementioned free zone, the protrusion-shaped machining error cannot become zero.

As a prior art for coping with a change in friction caused from the free zone, JP-A-7-13631 describes a technique for performing control by determining starting and ending positions of correction based on a moving amount from reversion of the servo motor and providing a velocity command.

However, in the technique disclosed in JP-A-7-13631 (Patent document 2), since the velocity command is corrected, the correction amount is changed according to a passing velocity in the same tool. Therefore, command amounts corresponding to various passing velocities need to be prepared, so that the control becomes complicated.

SUMMARY OF THE INVENTION

The present invention provides a servo motor controlling method and system capable of correcting a quadrant protrusion and a torque change with respect to a friction caused from a free zone at a time of reversion of a ball screw.

According to an aspect of the present invention, there is provided a servo motor controlling method of directly or indirectly detecting a position of a moving body which performs a circular-arc interpolation feeding motion by a servo motor and performing a feedback control for enabling the position of the moving body to comply with a position command, wherein, at a quadrant changing time when a moving direction of the moving body is changed, torque correction is performed on a torque command value according to a distance from a position where the moving direction is charged.

According to the servo motor controlling method of the present invention, the positions where the correction starts and ends are determined according to the distance from the reversion of the servo motor. The correction is performed not on the velocity command but on the torque command. Therefore, the required correction amount can be obtained from only one time measurement. In addition, although the quadrant passing velocity is changed, the correction amount is not changed, and a stable correction car be performed. In addition, each of the ball screw is provided with a specific length of the free zone, and the length of the free zone is not changed according to the moving velocity or the like. Therefore, the torque correction is performed according to the distance. Accordingly, a suitable correction can be performed without using the velocity.

Furthermore, according to another aspect of the present invention, there is provided a servo motor controlling method comprising: directly or indirectly detecting a position of a moving body which performs a circular-arc interpolation feeding motion by servo motor; and performing a feedback control for enabling the position of the moving body to comply with a position command; wherein a first torque correction for a static friction is performed at the position where the moving direction is changed, and a second torque correction for a moving friction after movement by the distance corresponding to the free zone.

DETAILED DESCRIPTION OF THE INVENTION

Hereinafter, a servo motor controlling method according to an embodiment of the present invention is be described in detail with reference to the accompanying drawings.

Figure 1:
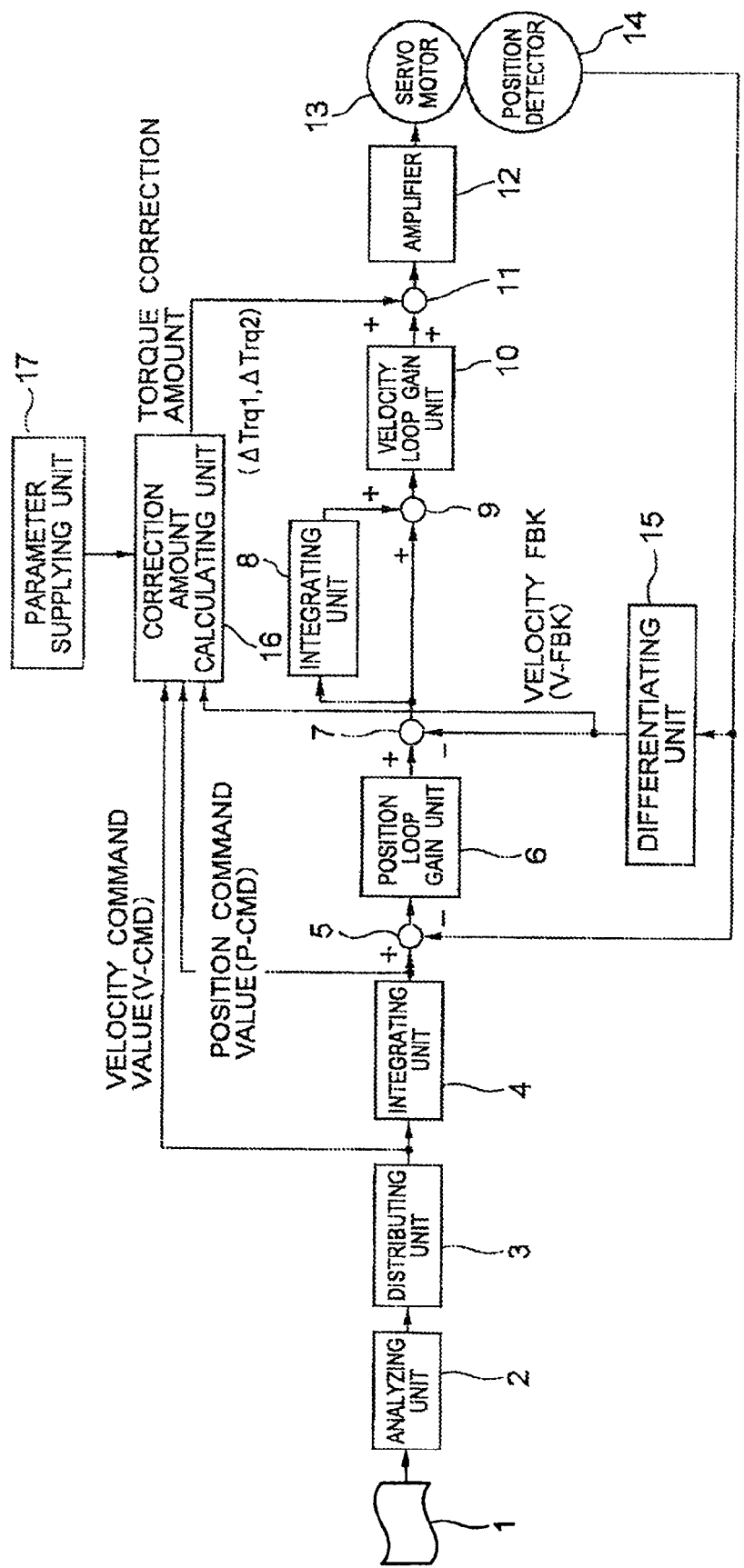
FIG. 1 is a block diagram illustrating a torque correcting system implementing a torque controlling method according to the present invention.
Figure 2:
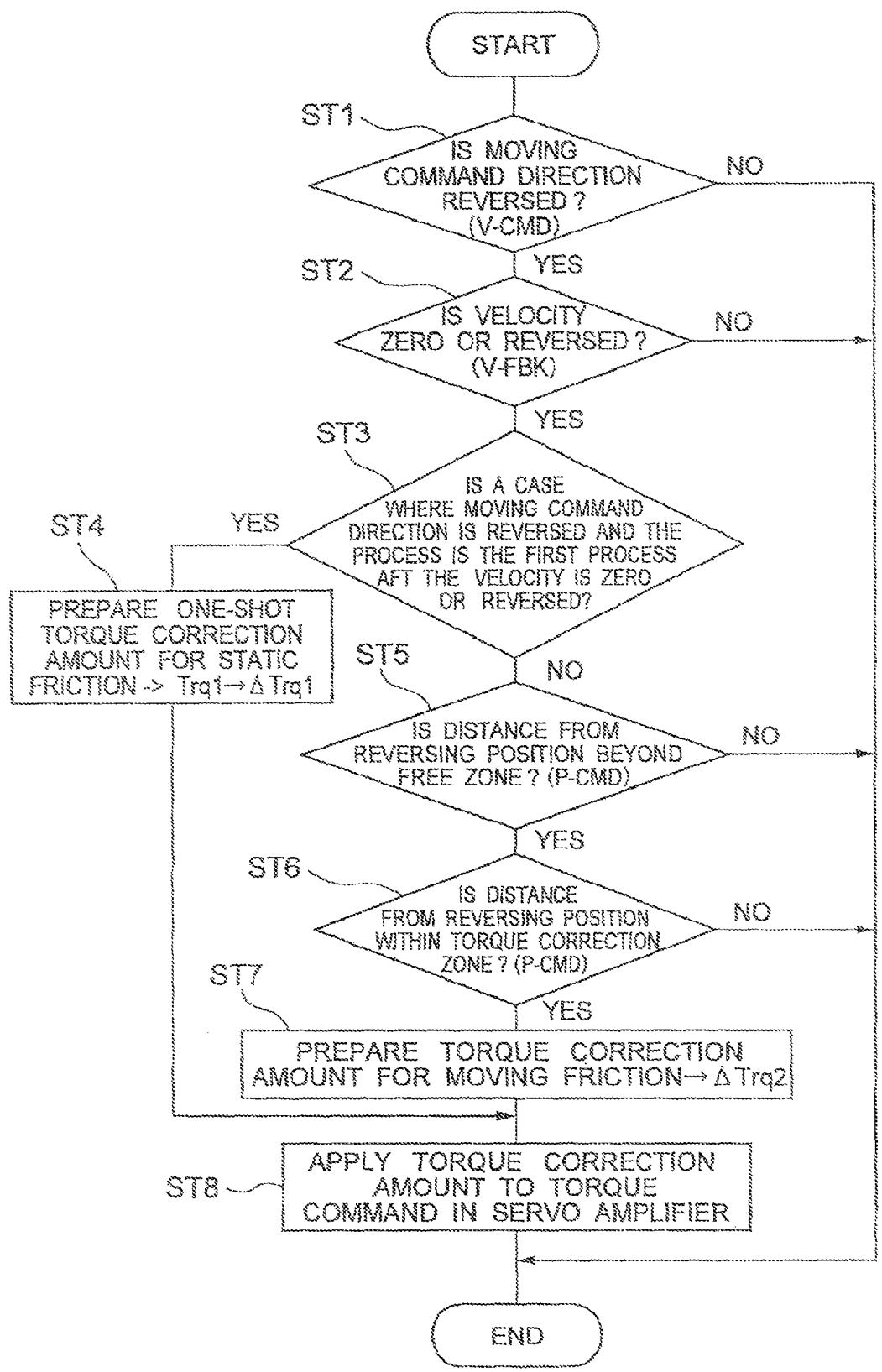
FIG. 2 is a flowchart illustrating a method torque controlling method according to the present invention.

FIG. 2 illustrates the torque controlling method according to the embodiment of the present invention, and FIG. 1 illustrates a whole construction of a servo system for implementing the torque controlling method. Before description thereof, an overview of a torque correction for the servo motor according to the present invention is firstly described. In the later description, an example of a correction of a protrusion-shaped machining error occurring at the time of reversion of a ball screw having a free zone of 0.02 mm is exemplified.

Figure 3:
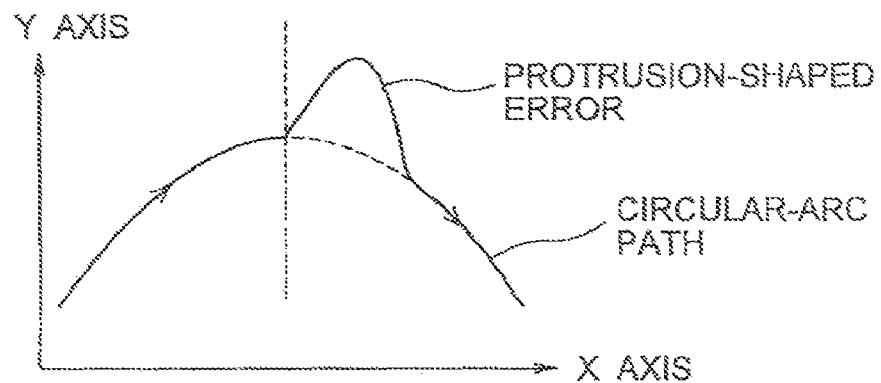
FIG. 3 is a graph illustrating a DBB measurement result (position error in a circular-arc radius direction) of a circular-arc quadrant changing portion in a case where torque correction is not performed.

FIG. 3 illustrates a position error in a circular-arc radius direction in a state where a specific torque correction is not performed.

In FIG. 3, a broken line illustrates an original circular-arc, and a solid line illustrates a shape of a machining error. In FIG. 3, the shape of the machining error is exaggerated for better understanding thereof. The central vertical line denotes a quadrant changing position at the time of reversion of the moving direction. It can be seen that a protrusion-shaped machining error (quadrant protrusion) where an actual moving path deviates out from a command path starts from the quadrant changing position.

As described above, the protrusion-shaped machining error is regarded to be caused from the response delay of the velocity loop at the quadrant changing time and the temporary stoppage of the feeding shaft. In addition, the protrusion-shaped machining error is regarded as being caused from the influence of the free zone where there is almost no friction, that is, it is substantially free or void of friction. Since the protrusion-shaped machining error deteriorates a quality of machining shape of a product severely, the protrusion-shaped machining error needs to be suitably corrected.

The graph of FIG. 3 is obtained by a precision shape measuring method called a double ball bar (DBB) measurement. The DBB measurement was developed by professor Dr. Yoshiaki Kakino in Department of Precision Engineering, Kyoto University. The principle behind the DBB measurement is described hereinafter. An apparatus where high precession spheres are provided to ends of a bar of an extendable measurement body having a moire scale is set through a magnetic plate between a main axis of a NC machine tool and a table. A circular-arc interpolation motion is performed on XY, YZ, and ZX planes with respect a center of one sphere. An extending amount generated from an error between a command value and an actual motion of the machine tool is detected, and an image of path is obtained by using a personal computer. A cause of the motion error car be analyzed based on the obtained path.

By using the DBB measurement system, the error of the NC machine tool in the circular-arc interpolation motion is detected, and the cause of the motion error can be obtained from the motion error path obtained by analyzing the motion accuracy. Accordingly, the accuracy of the NC machine tool can be improved, and the quality of machining of a product can be stabilized.

Figure 4:
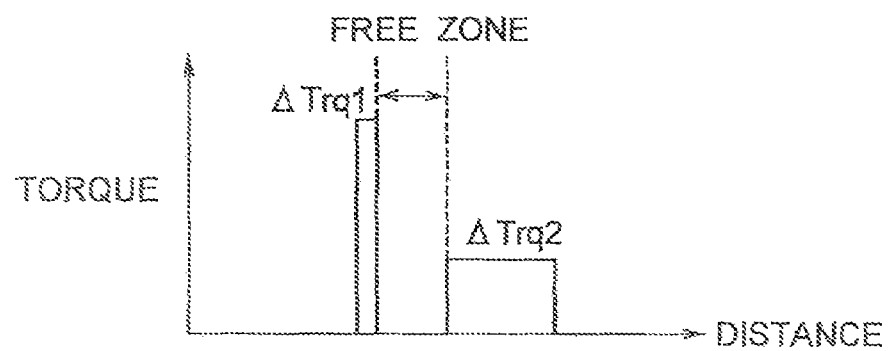
FIG. 4 is a waveform diagram illustrating a correction torque waveform at a time of moving direction reversion.

In order to reduce the protrusion-shaped machining error shown in FIG. 3, a correction torque waveform shown in FIG. 4 is applied to a servo amplifier at the time of reversion of the moving direction according to the present invention.

Referring to FIG. 4, a first correction torque Trq1 for a static friction, that is, a load at the time of reversion is applied, and subsequently, a second correction torque Trq2 for a moving friction, that is, a load at the time of starting moving after the reversion is generated according to a distance from the quadrant changing position, that is, the position of the reversion. The first correction torque command Trq1 for the static frictional force is a one-time pulse (one shot) command. The second correction torque command Trq2 for the moving frictional force is a torque command which is maintained over some distance.

Figure 5:
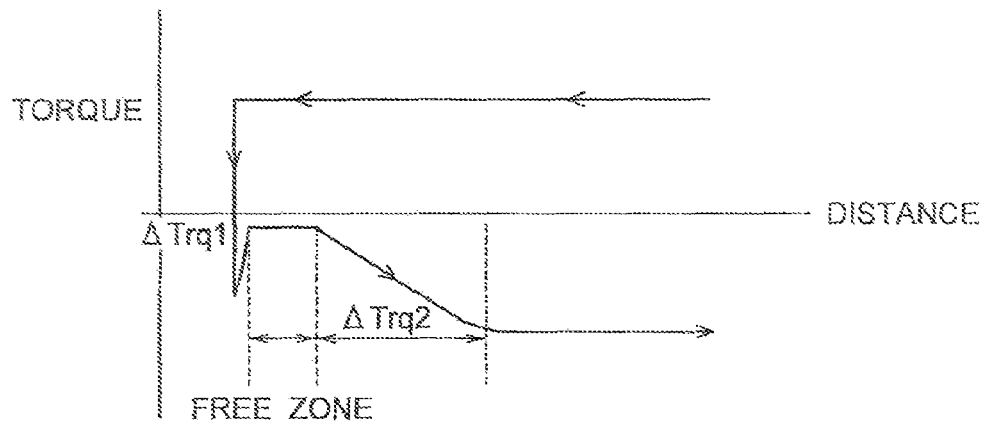
FIG. 5 is a waveform diagram illustrating a torque command reflecting a correction torque in FIG. 4.

A final torque command added with the aforementioned correction torque is applied to the servo motor as shown in FIG. 5. In the embodiment, with respect to the correction command value, in the first correction torque Trq1, the torque value is set to be undershot as a large minus value at the quadrant reversing time and to be almost zero in a free zone. Subsequently, in the second correction torque Trq2, the reverse-direction torque is set to be gradually increased.

Figure 6:
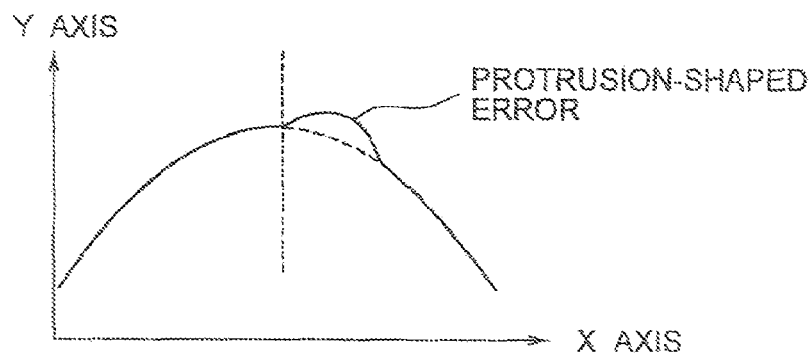
FIG. 6 is a graph illustrating a DBB measurement result in a case where a protrusion-shaped machining error is further reduced in comparison with the case of FIG. 3.
Figure 7:
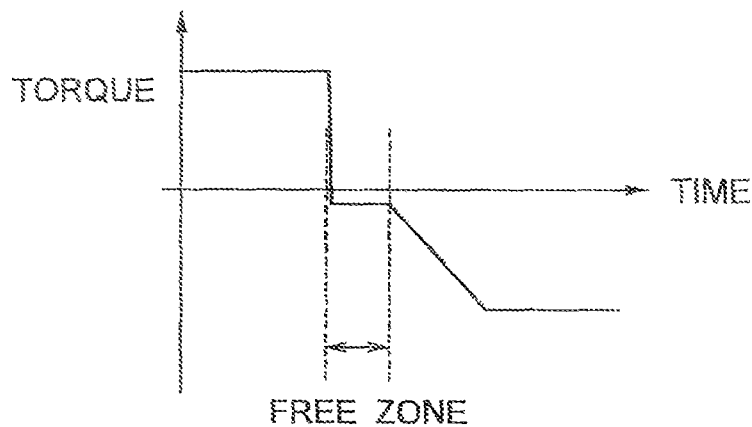
FIG. 7 s a waveform diagram illustrating a torque command in a case where the graph of FIG. 6 is obtained.

In order to reduce the protrusion-shaped machining error, the correction torque waveform is determined so that an optimal torque command waveform can be obtained. In correction, a torque for the friction at the time of reversion is assisted (corrected). The correction amount is adjusted with reference to the result of DBB measurement so that a depressed portion does not occur. In a case where an arbitrary positive correction torque is set, the result of DBB measurement is shown in FIG. 6. In comparison with FIG. 3, the protrusion-shaped machining error is reduced but slightly remained. The result of measurement of a torque waveform applied to the servo motor in this case is exemplified in FIG. 7. In this case, it can be seen that there is no large undershooting unlike FIG. 5.

In order to reduce to the protrusion-shaped machining error, a larger torque is applied. The result of DBB measurement is shown in FIG. 8, and the torque command applied to the servo motor is shown in FIG. 9.

Figure 8:
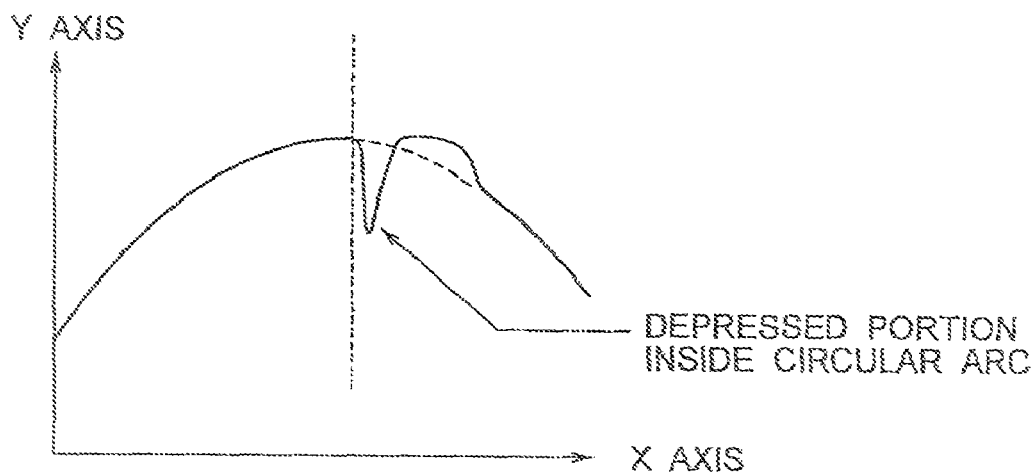
FIG. 8 is a graph illustrating a DBB measurement result in a case where a depressed portion inside a circular arc occurs by applying a large torque in order to reduce a protrusion-shaped machining error.
Figure 9:
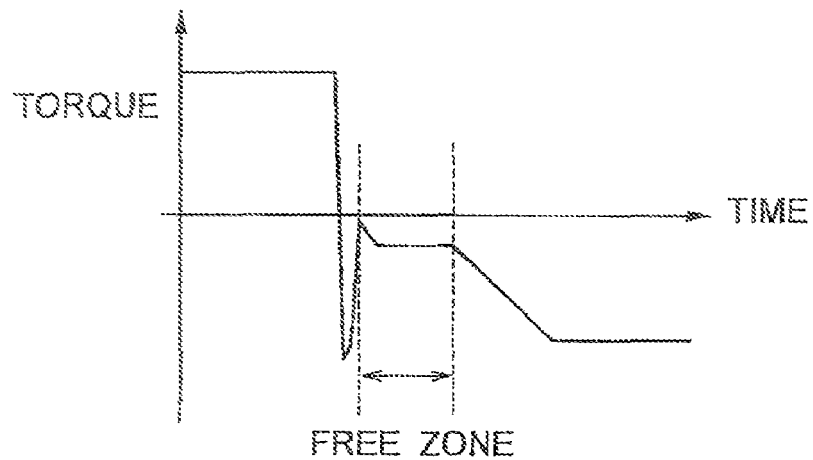
FIG. 9 is a waveform diagram illustrating a torque command applied to a servo motor in a case where the result of FIG. 8 is obtained.

In the result of DBB measurement shown in FIG. 8, the depressed portion inside the circular arc occurs. Therefore, it can be understood that, if only the correction torque is increased, the accuracy of shape is deteriorated.

Therefore, in order to improve the accuracy of shape at the quadrant chaining time, it is important to obtain the torque correction amount for the static friction at the quadrant changing time, the torque correction amount for the moving friction after the free zone, and an optimal combination thereof in the sequent correction sections and perform torque assistance based on the obtained torque correction amounts.

Figure 10:
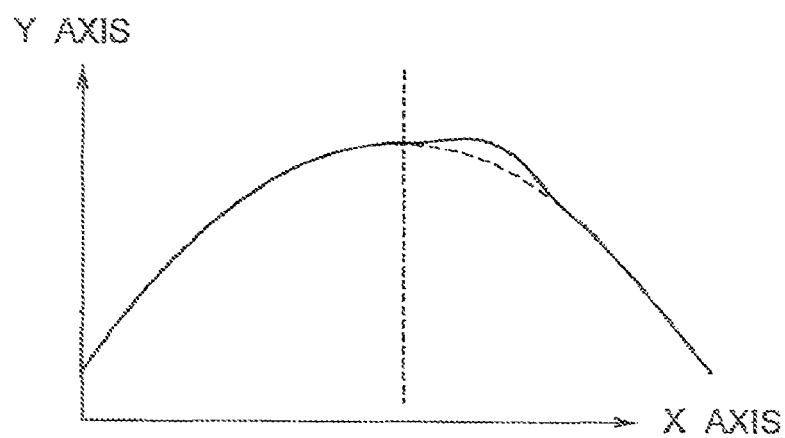
FIG. 10 is a graph illustrating a DBB measurement result in a case where the protrusion-shaped machining error is further reduced in comparison with the case of FIG. 6.
Figure 11:
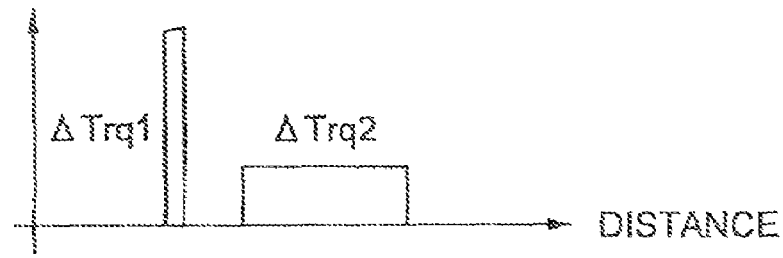
FIG. 11 is a waveform diagram illustrating a correction torque waveform in a case where the graph of FIG. 10 is obtained.

Therefore, while the DBB measurement is performed on various torque correction amounts and correction sections, the optimal correction torque amount is determined so that the depressed portion does not occur and the protrusion-shaped machining error is minimized. The obtained result of the DBB measurement is shown in FIG. 10, and the correction torque waveform thereof is shown in FIG. 11. In addition, the result of measurement of the torque command waveform obtained by applying the correction torque waveform is shown FIG. 12. It can be understood that the protraction-shaped machining error of FIG. 10 is greatly reduced in comparison with FIG. 5 where no correction is performed.

Preferably, the optimal correction torque amount is previously calculated at various operating conditions and stored as a parameter in a storage means such as a parameter generating unit included in a later-described correction amount calculating unit.

Figure 12:
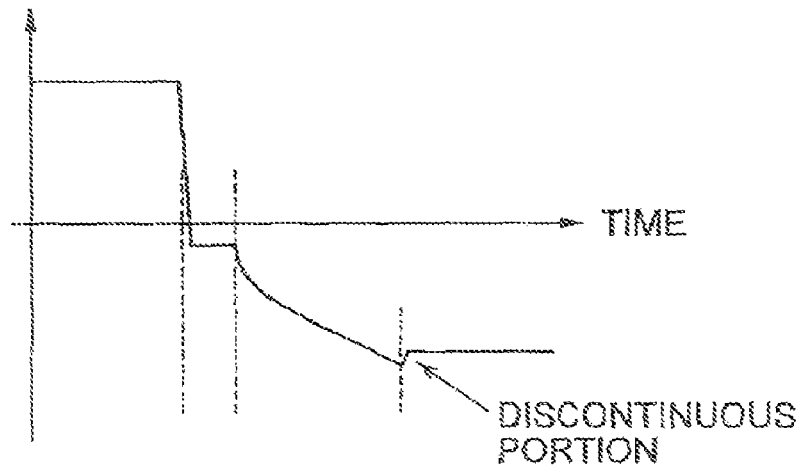
FIG. 12 is a waveform diagram illustrating a torque command reflecting the correction torque waveform of FIG. 11.

On the other hand, in a case where a torque is assisted in order to remove a delay caused from a friction of the machine tool over a predetermined section, a square-shaped torque correction amount which the correction torque abruptly becomes zero after a certain distance passed, so that an impact may be exerted on the motion of the feeding shaft. This case is shown in FIGS. 11 and 12. As shown in FIG. 11, the correction torque for the moving friction abruptly becomes zero after a predetermined interval. As shown in FIG. 12, at this time, a discontinuous portion occurs in the corresponding torque waveform, so that the impact caused from the abrupt change in the torque value is generated.

Figure 13:
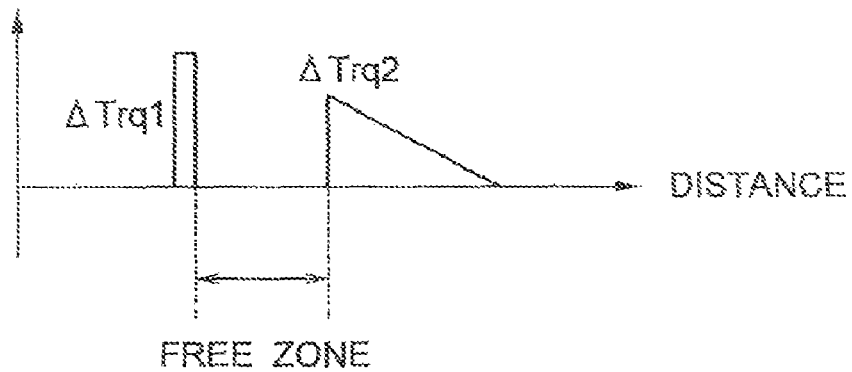
FIG. 13 is a waveform diagram illustrating a correction torque waveform using a gradually-decreasing type correction torque with respect to a moving friction so as to reduce shock.

As shown in FIG. 13, in order to prevent the occurrence of the impact, with respect to the torque correction amount for the moving friction, a gradually-decreasing type torque correction where the correction torque value is gradually decreased according to the distance is performed instead of the square-shaped torque correction of FIG. 11.

In the aforementioned embodiment, a ball screw having the free zone is exemplified. However, in some case, instead of the ball screw, a linear motor having no free zone may be used. In the linear motor, a driving power source is directly connected to a driving shaft, so that such a steel ball of the ball screw needs not to be provided. Since there is no free zone, a torque correction where the first and second correction torque Trq1 and Trq2 of FIGS. 11 and 13 are continuously connected to each other can be performed. Therefore, the torque correction using the first correction torque Trq1 can be omitted.

Figure 14:
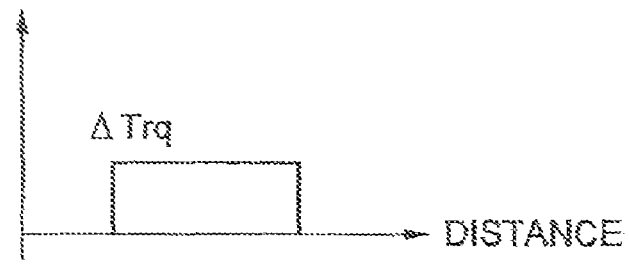
FIG. 14 is a waveform diagram illustrating a correction torque in a case where a free zone does not exist.
Figure 15:
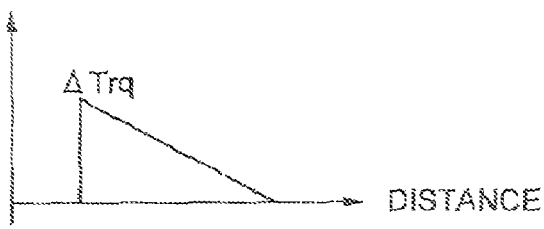
FIG. 15 is a waveform diagram illustrating a gradually-decreasing type correction torque in a case where a free zone does not exist.

An example of a typical correction torque waveform in case of no free zone is shown in FIG. 14. The correction torque waveform corresponds to FIG. 11. Similarly, the gradually-decreasing type correction torque waveform in case of no free zone is shown in FIG. 15. The correction torque waveform corresponds to FIG. 13. In any cases, the torque correction for the moving friction is performed according to the distance from the quadrant reversing time.

FIG. 1 is a block diagram illustrating a servo control system of a machine tool for implementing the aforementioned servo motor controlling method according to the embodiment of the present invention. In the embodiment, a predetermined load is mounted on a table of the NC machine tool. The table is moved in a circular-arc interpolation feeding motion with a predetermined circular arc radius at a predetermined feeding velocity.

Referring to FIG. 1, the servo motor 13 drives rotation of a feeding screw of a feeding shaft. The servo motor performs a two-axis control for feeding shafts of the table and saddle perpendicular to each other and applies the circular-arc interpolation feeding motion to the table.

Now, a construction and operations of the servo system are sequentially described.

When an NC command program is read out from a read only memory (ROM) (not shown) of a control unit or externally supplied, the NC command is analyzed by an analyzing unit to be converted into an NC execution data. A velocity command value V-CMD is extracted from a circular arc radius, a position command according to a feeding velocity, and the like included in the execution data by a distributing unit 3 and transmitted to an integrating unit 4. The velocity value is integrated in the integrating unit 4 to be output as a position command value P-CMD.

The output of the integrating unit 4 is transmitted through a subtraction circuit 5 to a position loop gain unit 6, so that a position loop gain is obtained. The position loop gain is transmitted through a subtraction circuit 7 to be applied to an integrating unit 8 and to one input port of an addition circuit 9. An output of the integrating unit 8 is applied to the other input port of the addition circuit 9. An output of the addition circuit 9 is applied to a velocity loop gain unit 10, so that a velocity loop gain is obtained. The velocity loop gain is input through an addition circuit 11 to a servo amplifier 12. The output of the servo amplifier 12 is supplied to a servo motor 13, so that the servo motor 13 is driven. The servo motor 13 is provided with a rotation position detector 14 such a rotary encoder, so that the rotation of the servo motor can be detected.

An output of the rotation position detector 14 is applied to the other input port of the subtraction circuit 5. In addition, the output of the rotation position detector 14 is differentiated by an differentiating unit 15. The differentiated value thereof is applied to the other input port of the subtraction unit 7 and to a correction amount calculating unit 16 as a velocity feedback (V-FBK). The aforementioned velocity command value (V-CMD) and position command value (P-CMD) are input to the correction amount calculating unit 16. The correction amount calculating unit 16 calculates a torque correction amount Trq based on parameters supplied from a parameter supplying unit 17 which stores parameters associated with a previously-obtained optimal torque correction amount. The obtained torque correction amount is applied to the other input port of the addition circuit 11. Therefore, the servo control system has two feedback loops, that is, the position feedback loop and the velocity feedback loop.

Accordingly, the servo control is performed based on the torque command value applied with the torque correction so that deviations of the position and velocity of the servo motor 13 from the command values become zero.

Among the processing blocks in FIG. 1, at least the distributing unit 3, the integrating unit 4, the position loop gain unit 6, the integrating unit 8, the differentiating unit 15, and the correction amount calculating unit 16 performs the corresponding processes in units of a period which is obtained through multiplication of a sampling period.

In addition, the position of the feeding shaft car be detected by using various direct or indirect position detecting units such as a laser interferometer and a piezo-type position detector as well as the aforementioned rotary encoder.

According to the construction shown in FIG. 1, the velocity command value V-CMD output from the distributing unit 3, the position command value P-CMD output from the integrating unit for the velocity command, and the velocity feedback V-FBK output from the differentiating unit 15 which differentiates the position feedback output from the rotation position detector 14, are input to the correction amount calculating unit 16. The correction amount calculating unit 16 generates the torque correction amount Trq with respect to the torque command value that is provided to the servo amplifier 12. More specifically, the aforementioned torque correction amount includes a first torque correction amount corresponding to a static friction at the time of reversion of the moving command direction and a second torque correction amount corresponding to a moving friction.

FIG. 2 is a flowchart illustrating the processes of the correction amount calculating unit 16 which outputs the torque correction amount applied to the torque command for the servo amplifier 12. Although the control of the feeding shaft 1 is exemplified, the same control may be performed on the other shafts.

After the process starts, it is determined whether or not the moving command direction is reversed (Step ST1). If the moving command direction is not reversed, the process ends. If the moving command direction is reversed, it is determined whether is the velocity obtained by the rotation position detector 14 is zero or reversed (Step ST2). If not, the process ends. The reversion of the velocity obtained by the rotation position detector 14 can be determined by determining whether or not a sign of the velocity feedback signal output from the differentiating unit 15 is reversed or not.

If the velocity is determined to be zero or reversed in Step ST2, it is determined whether the moving command direction is reversed and the process is the first process after the velocity is zero or reversed (Step ST3).

If the condition of Step ST3 is satisfied, the first torque correction amount Trq1 for correcting at one time (one shot) the static friction in the first path (process) is prepared (Step ST4). As described above, the correction amount is determined through a previous process or simulation as a value in such a range that the protrusion-shaped machining error is as small as possible and the depressed portion inside the circular arc cannot occur. The correction amount is stored in a memory (not shown) of a controlling unit.

If the process is not determined to be the first process in Step ST3, it is determined based on the position command value P-CMD and the position feedback value whether or not the distance from the reversing position is beyond the free zone (Step ST5). If the distance is within the free zone, the correction for the moving frictional force is not performed, but the process ends. Similarly, it is determined based on the position command value P-CMD and the position feedback value whether or not the distance from the reversing position s beyond the free zone and within the correction zone (Step ST6). If the distance is beyond the correction zone, the process ends. If the distance is within the correction zone, the second torque correction amount Trq2 for the moving friction is prepared (Step ST7). The command for the ending time of the second torque correction amount Trq2 is made based on the detected position.

The first torque correction amount Trq1 obtained in Step ST4 and the second torque correction amount Trq2 obtained in Step ST7 are applied through the correction amount calculating unit 16 to the torque command in the servo amplifier 12 as shown in FIG. 1 (Step ST8). Subsequently, the torque command is applied to the servo motor 13, so that that the driving thereof is performed.

As described in FIGS. 14 and 15, in a case where the there is no free zone, Steps ST5 and ST6 are omitted from the processes of the correction amount calculating unit 16 shown in the flowchart of FIG. 2, and the second torque correction amount Trq2 for the moving friction is used as the torque correction amount Trq.

As described above, with respect to preparation of the torque correction amount Trq, the torque command for correcting the static friction is prepared when the moving command direction is reversed and the process is the first process after the velocity obtained from the position detector is zero or reversed, and the torque command for correcting the moving friction is prepared when the distance from the reversing position is beyond the free zone and within the torque correction zone in a case where the process is not the first process after the velocity obtained from the position detector is zero or reversed.

Therefore, the torque command at the quadrant changing time when the moving direction of the moving body which performs the circular-arc interpolation feeding motion by the servo motor is changed is detected. The torque correction is performed on the torque command value in a range added with a specific free zone of the ball screw according to a traction torque model in such a direction that the friction torque is cancelled.

According to the servo motor controlling method of the present invention, the positions where the correction starts and ends are determined according to the distance from the reversion of the servo motor. The correction is performed not on the velocity command but on the torque command. Therefore, the required correction amount can be obtained from only one time measurement. In addition, although the quadrant passing velocity is changed, the correction amount is not changed, and a stable correction can be performed. In addition, each of the ball screw is provided with a specific length of the free zone, and the length of the free zone is not changed according to the moving velocity or the like. Therefore, the torque correction is performed according to the distance. Accordingly, a suitable correction can be performed without using the velocity.

Figure 16:
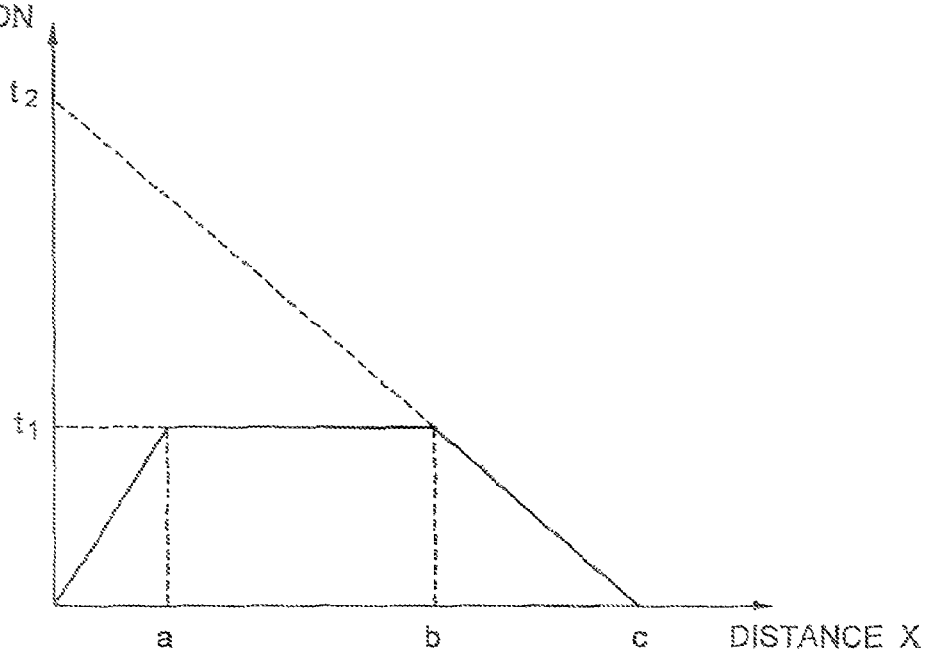
FIG. 16 is a waveform diagram illustrating an example where a correction torque pattern with respect to a moving friction has predetermined rising and falling angles.

Although the correction torque waveform pattern for the moving friction is rising or failing at almost vertical direction at the starting or ending time in the aforementioned embodiment, the actual correction torque waveform pattern may be rising or falling at a predetermined slope as shown in FIG. 16.

For simplifying the description, the ending position of the free zone may be taken as a reference point, and the correction torque waveform may have a trapezoid having a rising slope region expressed by Equation $t=(t1/a)x$, a horizontal region expressed by Equation $t=t1$, and a failing slope region expressed by Equation $t=t2-(t2/a)x$. In this case, if the failing slope is set to be low, the torque correction is performed more gradually, so that an abrupt change causing an impact on the torque correction can be avoided as described above.

The present invention is not limited to the aforementioned embodiment. But, the present invention can be adopt to any case where the torque correction is performed on the torque command at the quadrant changing time according to the distance from the quadrant changing position, irrespective of types of a control symmetric shaft or a controlling unit.

What is claimed is:

1. A servo motor controlling method comprising:
directly or indirectly detecting a position of a body moved by a servo motor;
controlling the servo motor via feedback based on the detected position of the body with position command to cause an arc interpolation motion; and
when a moving direction of the body changes as the arc interpolation motion changes from one quadrant to an adjacent quadrant, correcting a torque command value used to control the servo motor according to a distance between the position of the body after the chance in moving direction and a position at which the change in moving direction of the body occurred;
wherein when the body has a zone of movement substantially free of friction, the torque is not corrected when the position of the body after the change in moving direction is within the zone and the torque is corrected when the position of the body after the change in moving direction is outside the zone, and when the body is void of such zone, the torque is corrected according to the distance between the position of the body after the change in moving direction and the position at which the change in moving direction of the body occurred.

2. The servo motor controlling method according to claim 1, wherein the torque correction for a static friction is performed at the position at which the change in moving direction of the body occurred.

3. The servo motor controlling method according to claim 2, wherein the torque correction for the static friction is applied as a one-time pulse.

4. The servo motor controlling method according to claim 1, wherein:
the torque correction for a moving friction is performed when the position of the body after the change in moving direction is outside of the low-friction zone of movement, and
the torque correction amount for the moving friction decreases in time.

5. A servo motor controlling method comprising:
directly or indirectly detecting a position of a body moved by a servo motor;
controlling the servo motor via feedback based on the detected position of the body with a position command to cause an arc interpolation motion; and
when a moving direction of the body changes as the arc interpolation motion changes from one quadrant to an adjacent quadrant, correcting a torque command value used to control the servo motor;
wherein a first correction of the torque command value for a static friction is performed at a position at which the change in moving direction of the body occurred, and a second correction of the torque command value for a moving friction is performed when the position of the body after the change in moving direction is outside a zone of movement substantially free of friction.

* * * * *